US010053002B2

(12) United States Patent
Randolph et al.

(10) Patent No.: US 10,053,002 B2
(45) Date of Patent: Aug. 21, 2018

(54) TRAILER LIGHT CHECK ACTIVATION SYSTEM

(71) Applicant: NISSAN NORTH AMERICA, INC., Franklin, TN (US)

(72) Inventors: Corey Randolph, Farmington Hills, MI (US); Ernest Workman, Farmington Hills, MI (US); Jonathon Ratliff, Farmington Hills, MI (US); Kouhei Kasedo, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 15/143,290

(22) Filed: Apr. 29, 2016

(65) Prior Publication Data

US 2017/0313240 A1    Nov. 2, 2017

(51) Int. Cl.
*B60Q 1/44* (2006.01)
*B60T 7/02* (2006.01)
*B62D 63/08* (2006.01)
*G07C 5/08* (2006.01)

(52) U.S. Cl.
CPC ............... *B60Q 1/44* (2013.01); *B60T 7/02* (2013.01); *B62D 63/08* (2013.01); *G07C 5/0816* (2013.01)

(58) Field of Classification Search
CPC .. B60Q 1/44; B60T 7/02; B62D 63/08; G07C 5/0816
USPC ............................................. 701/70; 340/431
See application file for complete search history.

(56) References Cited

U.S. PATENT DOCUMENTS

| | | | |
|---|---|---|---|
| 4,547,722 A | 10/1985 | Sarlo | |
| 4,866,390 A | 9/1989 | Butchko | |
| 5,095,276 A | 3/1992 | Nepil | |
| 5,498,910 A | 3/1996 | Hopkins et al. | |
| 5,602,482 A | 2/1997 | Gutierrez | |
| 5,604,439 A | 2/1997 | Walkington et al. | |
| 5,725,228 A | 3/1998 | Livingston | |
| 5,990,788 A | 11/1999 | Syracuse | |
| 6,043,661 A | 3/2000 | Gutierrez | |
| 6,081,189 A | 6/2000 | Warner | |
| 6,100,801 A | 8/2000 | Plummer | |
| 6,154,035 A | 11/2000 | Aguirre et al. | |
| 6,218,952 B1* | 4/2001 | Borland ................ | B60Q 1/305 340/641 |
| 7,301,479 B2* | 11/2007 | Regan ..................... | G08G 1/16 340/431 |
| 7,339,465 B1 | 3/2008 | Cheng et al. | |
| 7,345,579 B2 | 3/2008 | Nelson et al. | |
| 7,786,849 B2* | 8/2010 | Buckley ................ | G08G 1/165 180/271 |
| 8,031,061 B2 | 10/2011 | Kalous | |

(Continued)

FOREIGN PATENT DOCUMENTS

GB    2362143 A   * 11/2001

*Primary Examiner* — Marthe Y Marc-Coleman
(74) *Attorney, Agent, or Firm* — Young Basile Hanlon & MacFarlane, P.C.

(57) ABSTRACT

A vehicle comprises a control system. The control system is connectable to a trailer and includes a trailer connection checking mode in which the control system actuates trailer lights of the trailer in a predetermined sequence. The control system makes a trailer presence determination of whether the trailer is connected to the control system. According to the trailer presence determination, the control system performs the trailer connection checking mode.

20 Claims, 12 Drawing Sheets

(56) References Cited

U.S. PATENT DOCUMENTS

| | | |
|---|---|---|
| 8,465,041 B2 | 6/2013 | Riibe |
| 8,816,691 B2 | 8/2014 | Miller et al. |
| 8,816,697 B2 | 8/2014 | Miller et al. |
| 9,278,673 B2 | 3/2016 | Squire et al. |
| 2003/0052532 A1 | 3/2003 | Costello et al. |
| 2005/0258947 A1 | 11/2005 | Kunianski |
| 2006/0181391 A1* | 8/2006 | McNeill ............... B65G 69/005 340/5.61 |
| 2008/0191449 A1* | 8/2008 | Standen ................. B60D 1/36 280/427 |
| 2008/0265904 A1 | 10/2008 | Biel |
| 2009/0072956 A1 | 3/2009 | Kalous |
| 2010/0237875 A1 | 9/2010 | Limcolioc |
| 2013/0221970 A1 | 8/2013 | Miller et al. |
| 2013/0221981 A1 | 8/2013 | Miller et al. |
| 2014/0015657 A1 | 1/2014 | Hanson et al. |
| 2014/0246974 A1* | 9/2014 | Motts .................... B60Q 1/305 315/77 |
| 2015/0251697 A1* | 9/2015 | Lavoie .................. B62D 13/06 701/523 |
| 2015/0325126 A1* | 11/2015 | Schwindt ................ G08G 1/16 701/36 |
| 2016/0039456 A1* | 2/2016 | Lavoie ................ B62D 15/027 701/41 |
| 2016/0167663 A1* | 6/2016 | Sutton ............... B60K 17/3467 701/54 |
| 2016/0244037 A1* | 8/2016 | Lee ......................... B60T 7/12 |
| 2017/0100975 A1* | 4/2017 | Ruiz ....................... B60D 1/64 |
| 2017/0123431 A1* | 5/2017 | Ghneim ............... G05D 1/0246 |

* cited by examiner

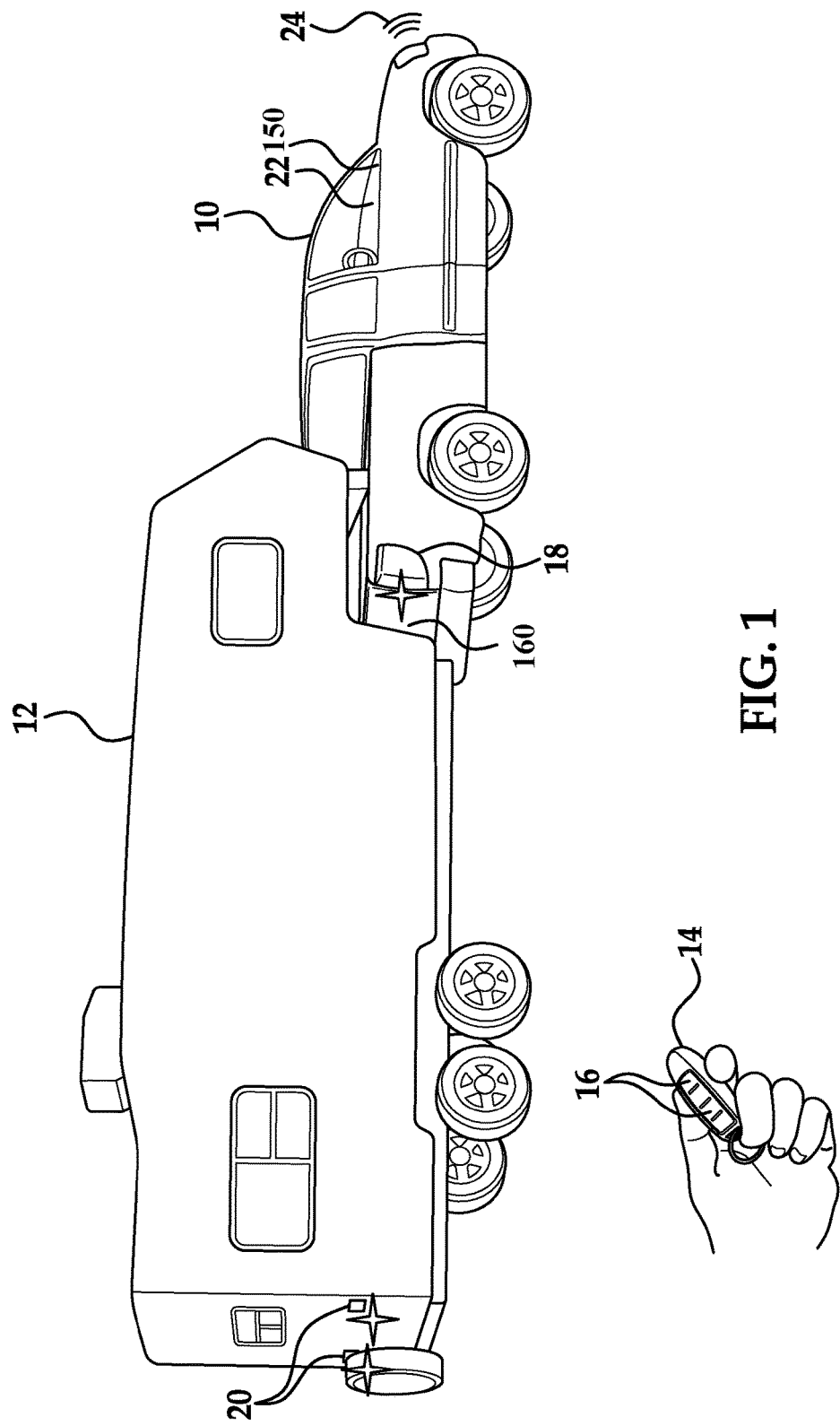

TRAILER LIGHT CHECK ACTIVATION SYSTEM

CROSS-REFERENCE TO RELATED APPLICATION(S)

None.

TECHNICAL FIELD

The embodiments disclosed herein generally relate to lighting systems for vehicles configurable for towing a trailer.

BACKGROUND

Vehicles are commonly configured for towing trailers by way of a hitch or other mechanical coupling. Vehicles are also commonly configured for electrical coupling to trailers. For example, a vehicle configured for towing a trailer may have a number of exterior vehicle lights, which can include indicator lights such as turn signals, brake lights and reverse lights, and other exterior lights such as taillights and running lights. The trailer may also have a number of similar exterior lights, some or all of which may correspond to an exterior light of the vehicle. A wiring harness or other electrical connection can be used to electrically couple a trailer light to a corresponding vehicle light, such that the trailer light is actuated in conjunction with actuation of the corresponding vehicle light.

In order to check the electrical connection between a vehicle and a trailer, it is typically necessary to actuate each of the vehicle lights. This procedure includes manual actuation of the vehicle lights from a position inside the vehicle. However, it is also necessary to confirm actuation of the trailer lights in conjunction with the actuation of their corresponding vehicle lights, which cannot be accomplished from a position inside the vehicle. Therefore, a second person is necessary to perform this procedure of checking the electrical connection between a vehicle and a trailer to confirm actuation of the trailer lights.

U.S. Pat. Nos. 8,816,691 and 8,816,697, which are incorporated herein by reference in their entireties, disclose trailer connection checking devices and methods. It would be advantageous to provide still further trailer connection checking devices and methods, including activation systems and methods therefor.

SUMMARY

Disclosed herein is a vehicle comprising a control system. The control system is connectable to a trailer and includes a trailer connection checking mode in which the control system actuates trailer lights of the trailer in a predetermined sequence. The control system makes a trailer presence determination of whether the trailer is connected to the control system. According to the trailer presence determination, the control system performs the trailer connection checking mode.

In another aspect, a vehicle includes a vehicle controller, a trailer brake controller, and a visual display. The vehicle controller is connectable to trailer lights of a trailer, and includes a trailer connection checking mode in which the vehicle controller operates the trailer lights in a predetermined sequence. The trailer brake controller is connectable to trailer brakes of the trailer, and is operable to control the trailer brakes. The visual display is in communication with the controller. One of the vehicle controller or the trailer brake controller makes a trailer presence determination of whether a trailer is present. In response to the trailer presence determination, the vehicle controller causes the visual display to display a dynamic prompt instructing a user input selectable by a user for initiating the trailer connection checking mode.

In yet another aspect, a method is provided for checking trailer light operation. The method includes a step of making a trailer presence determination of whether a trailer is present. Another step includes providing a dynamic prompt to a user for initiating a trailer connection checking mode in which trailer lights of the trailer are operated in a predetermined sequence.

These and other aspects of the present disclosure are disclosed in the following detailed description of the embodiments, the appended claims and the accompanying figures.

BRIEF DESCRIPTION OF THE DRAWINGS

The present disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 1 is a perspective view of a trailer coupled to a vehicle and showing an example of an operator input device.

DETAILED DESCRIPTION

Figure 2A:
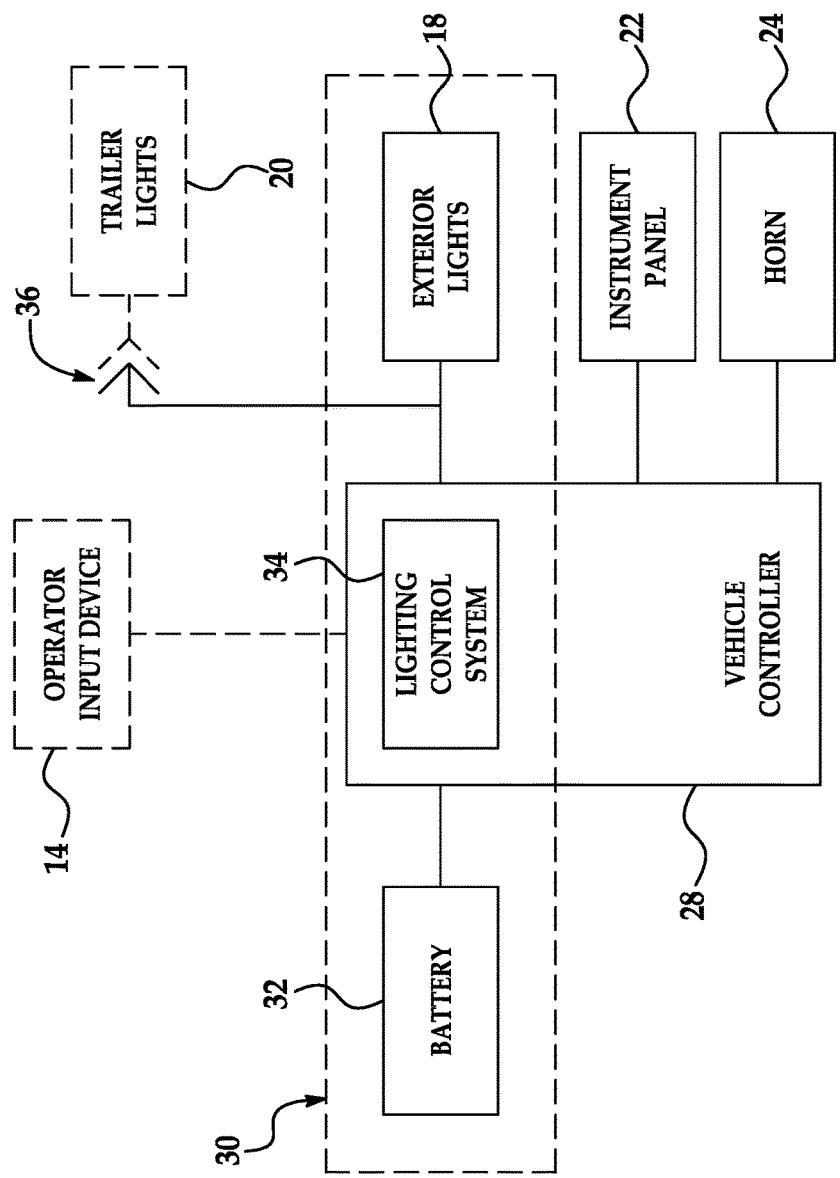
FIG. 2A is a system view showing a vehicle controller configured to control various functions of the vehicle in communication with the operator input device.

Disclosed herein are embodiments of a system and method that obviates the need for multiple persons to perform a check of an electrical connection between a vehicle and a trailer.

As shown in FIG. 1, a vehicle 10 can be configured for towing a trailer 12. The term "vehicle" is used herein generally to describe a vehicle or other road going or off-road motive device that can be configured for towing a trailer. Similarly, the term "trailer" is used herein generally to describe any vehicle that can be coupled to and towed by the vehicle 10. The trailer 12 is illustrated as a common recreational vehicle, but could also be a boat trailer, a utility trailer, a stock trailer or any other type of trailer. The vehicle 10 can be coupled to the trailer 12 by a coupling (not shown), such as a mechanical coupling. Common mechanical couplings include tow bars and hitches, but any other standard or custom coupling could be used.

The vehicle 10 can also be commutatively coupled to an operator input device 14. The vehicle 10 is responsive to the operator input device 14 to control various aspects of the vehicle 10. For example, the vehicle 10 can lock and unlock the vehicle, start the vehicle, unlatch its trunk or initiate a panic alarm in response to the operator input device 14. The operator input device 14 can be a device that is removable from the vehicle 10. As a non-limiting example, the operator input device 14 can be a key fob for the vehicle 10, as shown in FIG. 1. The operator input device 14 could also be a device included in the vehicle 10, such as a button included in the interior or on the exterior of the vehicle 10. The operator input device 14 is shown as having a plurality of inputs 16 for communicating with the vehicle 10.

Both the vehicle 10 and the trailer 12 can have lights for communicating driving intentions, safety lights, accessory lights and/or convenience lights, as non-limiting examples. The vehicle 10 can include a number of exterior vehicle lights 18, which as shown in FIG. 2B can include headlights, a left turn indicator light, a right turn indicator light, a brake indicator light, a backup indicator light, tail lights, or a running light, for example. Similarly, the trailer 12 can include a variety of trailer lights 20. Some or all of the trailer lights 20 can correspond to one or more of the exterior vehicle lights 18. By way of example, an exterior vehicle light 18 can be a right turn indicator light, and a trailer light 20 can correspond to the right turn indicator light such that the trailer light 20 is actuated in conjunction with the right turn indicator light. Some or all of the other exterior vehicle lights 18 can similarly correspond to respective trailer lights 20.

The vehicle 10 can include various other standard and/or accessory features. For example, an interior of the vehicle 10 can include a dash mounted instrument panel 22. The instrument panel 22 can house components configured for controlling aspects of the operation of the vehicle 10, and can house gauges, indicators and displays for displaying or indicating operating parameters of the vehicle 10 or other environmental information. The instrument panel 22 can further house components for producing alarms and alerts, such as audible signals and/or visual signals or displays, and can house other components for relaying information relating to the actual or desired functioning of the vehicle 10 to and from an operator of the vehicle 10. Although these components are described in a non-limiting example with reference to a dash mounted instrument panel 22, these components could additionally or alternatively be housed otherwise within the interior or on the exterior of the vehicle 10. For instance, components for producing alarms and alerts, such as audible signals and/or visual signals or displays could be included on the exterior of the vehicle 10. For example, the vehicle 10 can include a vehicle horn 24. The vehicle horn 24 can be a standard vehicle horn configured to provide an audible warning signal, although the vehicle horn 24 could be any other device configured to sound an audible signal perceivable from outside of the vehicle 10.

Figure 2B:
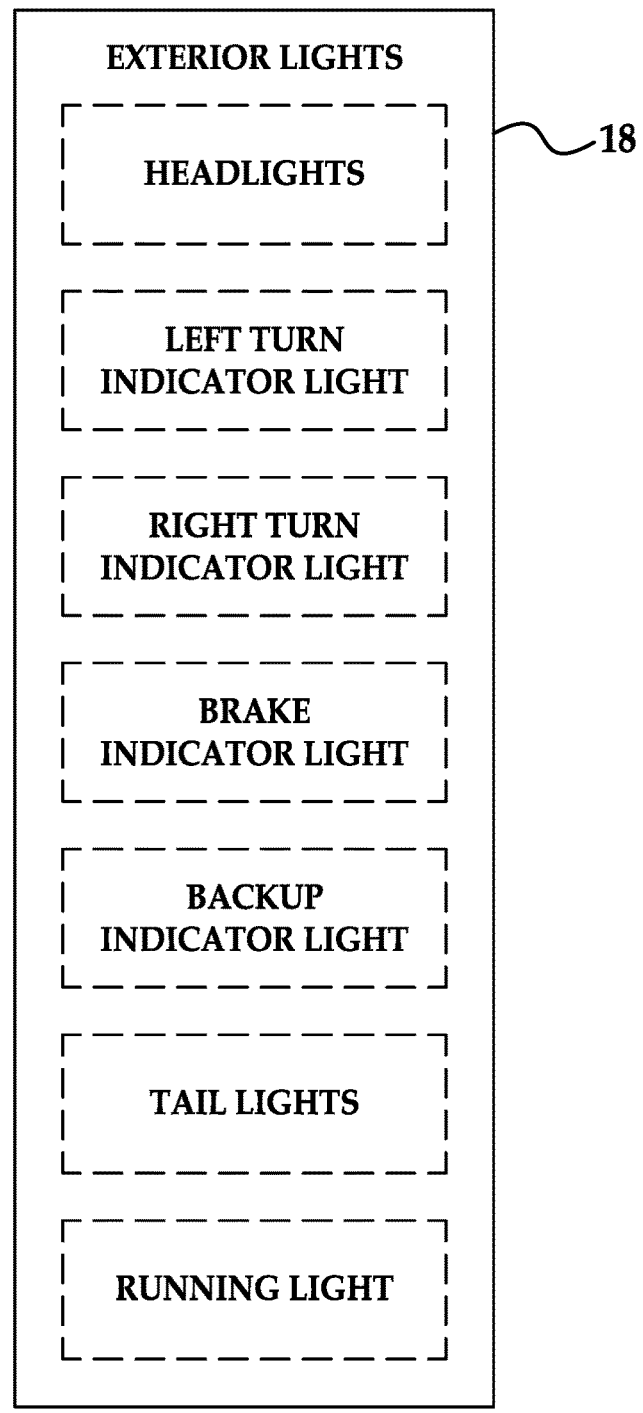
FIG. 2B is a system view showing examples of the vehicle's exterior vehicle lights.

As shown in FIG. 2A, the vehicle 10 can include a vehicle controller 28 for controlling electrical and/or electromechanical functions of the vehicle 10. The vehicle controller 28 could be a body control module (BCM) or other. The lighting control system 34 can be or include one or more controllers configured for controlling individual actuation of the exterior vehicle lights 18. A controller could be an electronic control unit (ECU), such as a microcomputer including a random access memory (RAM), a read-only memory (ROM) and a central processing unit (CPU) in addition to various input and output connections. Generally, the control functions described herein can be implemented by one or more software programs stored in internal or external memory and are performed by execution by the CPU. However, some or all of the functions could also be implemented by hardware components. Although the vehicle controller 28 is shown and described as a single controller for performing multiple functions, the functions described herein could be implemented by separate controllers which collectively comprise the illustrated vehicle controller 28.

The vehicle controller 28 can be configured to control aspects of the operation of the vehicle 10, including operation of the exterior vehicle lights 18, the instrument panel 22 and the vehicle horn 24, for example. The vehicle controller 28 can include a lighting control system 34. The vehicle 10 can include a power supply, such as a battery 32, for providing an electrical power suitable for actuating the exterior vehicle lights 18, operating the components of the instrument panel 22 and operating the vehicle horn 24. The exterior vehicle lights 18, the instrument panel 22 and the vehicle horn 24 can be electrically coupled to the battery 32 through mechanical or electrical switches, or, as illustrated, can be electrically coupled to the battery 32 by the vehicle controller 28. The vehicle controller 28 and/or the lighting control system 34 can directly supply electrical power to the exterior vehicle lights 18, the instrument panel 22 and the vehicle horn 24, or, for example, can indirectly cause the supply of electrical power through relays or through other mechanical or electrical switches known to those skilled in the art.

As shown, the exterior vehicle lights 18 can be included in a lighting system 30 of the vehicle 10. The lighting system 30 can include the battery 32. The exterior vehicle lights 18 can be electrically coupled to the battery 32. For example, the exterior vehicle lights 18 can be electrically coupled to the battery 32 through a lighting control system 34, by the vehicle controller 28 through the lighting control system 34 performed by the vehicle controller 28, and/or through other mechanical and/or electrical switches. The lighting control system 34 can be configured to control actuation of each of the exterior vehicle lights 18. The term "actuate" and its derivatives used to describe operation of the exterior vehicle lights 18 should be understood broadly as including continuous operation, intermittent or other non-continuous operation, or any other operation of the exterior vehicle lights 18. For example, an exterior vehicle light 18 be actuated steadily, or can be blinked, flashed, dimmed or amplified. In normal operation, the lighting control system 34 can control operation of the exterior vehicle lights 18 in accordance with a normal mode. The normal mode can include controlling actuation of one or more of the exterior vehicle lights 18 during normal driving operation of the vehicle 10 in response to, for example, an operator depressing a brake pedal, an operator working a turn signal switch, an operator working a hazard light switch, an operator placing the vehicle 10 in a reverse state, an operator or the lighting control system controlling a headlamp, an operator causing the vehicle 10 to lock or unlock, and/or an operator causing the vehicle 10 to start-up or shut-down, for example by working an ignition switch or a remote starting device.

Figure 3:
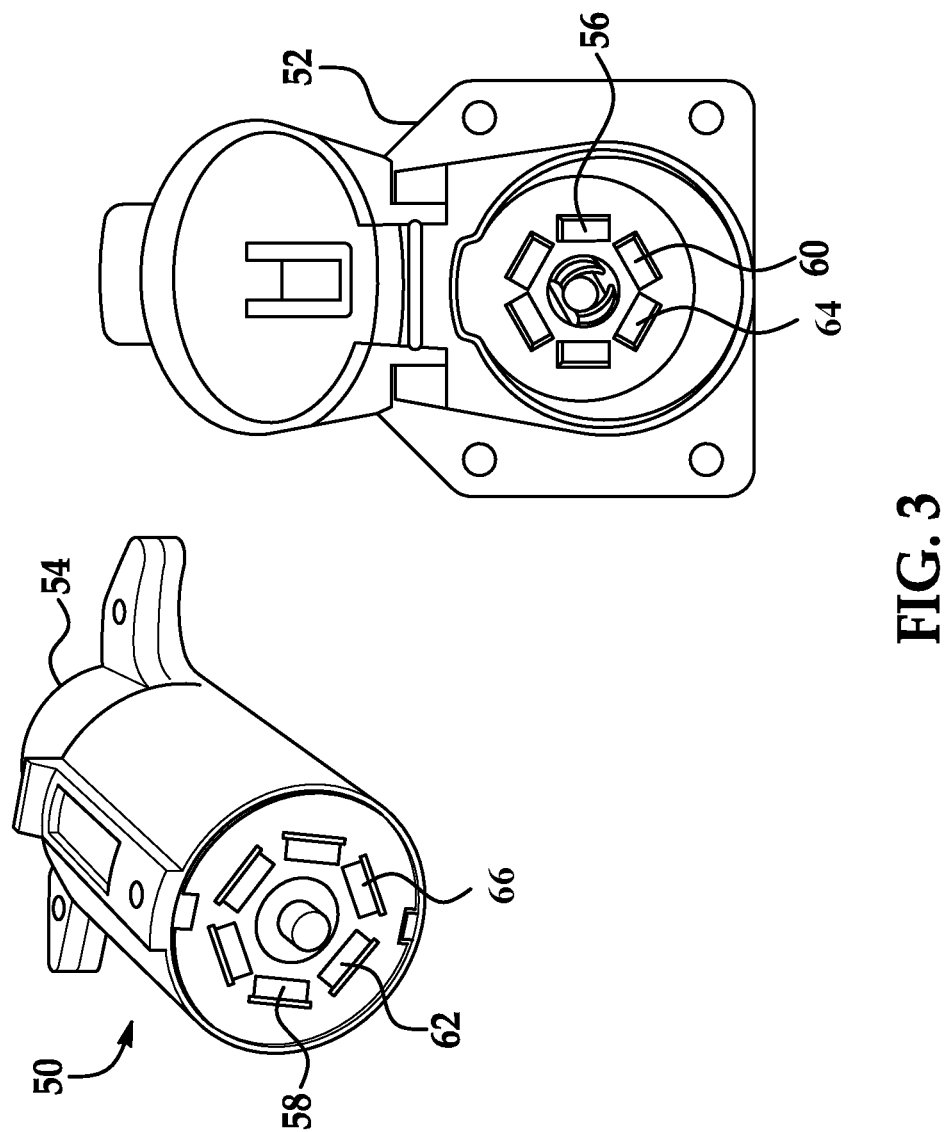
FIG. 3 is an example of an electrical connector configured for electrically coupling the vehicle to the trailer.

The lighting system 30 can also include a terminal connection 36, which can be configured to electrically connect and/or associate the exterior vehicle lights 18 to respective corresponding trailer lights 20. In one implementation, the terminal connection 36 can be accomplished with an electrical connector 50, as shown in FIG. 3. The illustrated electrical connector 50 includes a first end 52 configured for inclusion in the vehicle 10 and a second end 54 configured for inclusion in the trailer 12. The electrical connector 50 includes a number of terminals for providing a direct electrical connection between an exterior vehicle light 18 and a trailer light 20.

For example, a terminal 56 of the first end 52 can be wired in parallel to an electrical supply line for conveying an electrical power used to actuate a right turn indicator light of the vehicle 10. A respective terminal 58 of the second end 54 can, in turn, be electrically connected to a corresponding trailer light 20, such that a portion of the electrical power used actuate the right turn indicator light is diverted through the terminals 56 and 58 and supplied to the corresponding trailer light 20 in conjunction with the actuation of the right turn indicator light. Similarly, a terminal 60 of the first end 52 can be wired in parallel to an electrical supply line for conveying an electrical power used to actuate a brake indicator light of the vehicle 10. A respective terminal 62 of the second end 54 can, in turn, be electrically connected to a corresponding trailer light 20, such that a portion of the electrical power used to actuate the brake indicator light is diverted through the terminals 60 and 62 and supplied to the corresponding trailer light 20 in conjunction with the actuation of the brake indicator light. In this manner, the vehicle controller 28 including the lighting control system 34 can be electrically coupled to terminals 56, 60 of the first end 52, with each of the terminals 56, 60 associated with an exterior vehicle light 18 and a corresponding trailer light 20. By controlling actuation of an exterior vehicle light 18, the vehicle controller 28 can cause an electrical power to be supplied to the terminal, in addition to being supplied to the exterior vehicle light 18. When the first end 52 is coupled to the second end 54, the electrical power is also supplied to the terminals 58, 62 to actuate respective corresponding trailer lights 20.

In the illustrated implementation of a terminal connection 36, the electrical connector 50 is a standard 7-way trailer connector, although other standard trailer connectors can be used, such as a standard 4-way trailer connector, a standard 5-way trailer connector or a standard 6-way trailer connector, for example. In these or similar electrical connectors 50, not all of the terminals need be directly electrically connect to an exterior vehicle light 18. For example, terminals could also be used to supply a power or ground connection between the vehicle 10 and the trailer 12, or could be used to communicate control signals. As an alternative to or in addition to the illustrated electrical connector 50, a non-standard, custom or proprietary electrical connector could be used to implement the terminal connection 36.

The above description of an implementation of the terminal connection 36 using an electrical connector 50 is described for illustration only. Although the illustrated electrical connector 50 is configured to provide a direct electrical connection between an exterior vehicle light 18 and a respective trailer light 20, other implementations of a terminal connection 36 known to those skilled in the art could be used to electrically connect and/or associate the exterior vehicle lights 18 to respective corresponding trailer lights 20. For example, the vehicle controller 28 including the lighting control system 34 could provide for conveyance of an electrical power to a terminal connection 36 separate from the electrical power supplied to exterior vehicle lights 18. Alternatively, vehicle controller 28 could provide control signals to a terminal connection 36 for instructing another lighting control system, such as a lighting control system included in the trailer 12, to actuate the trailer lights 20 in conjunction with respective corresponding exterior vehicle lights 18.

When one or more trailer lights 20 of a trailer 12 are electrically coupled to respective corresponding exterior vehicle lights 18 of a typical vehicle 10, correct functioning of the terminal connection 36 must be checked. Typically, this procedure requires manual actuation of the exterior vehicle lights 18. For example, a right turn indicator light could be actuated in response to an operator working a turn signal switch, or a brake indicator light could be actuated in response to an operator depressing a brake pedal. These manual operations must be accomplished from a position inside the vehicle 10. However, in order to confirm correct functionality of both the terminal connection 36 and trailer lights 20, the procedure also requires visual confirmation of corresponding actuation of the respective corresponding trailer lights 20, which cannot be accomplished from a position inside the vehicle 10. It can be seen that the typical procedure of checking the terminal connection 36 requires a person in addition to the person confirming actuation of the trailer lights 20.

Figure 4:
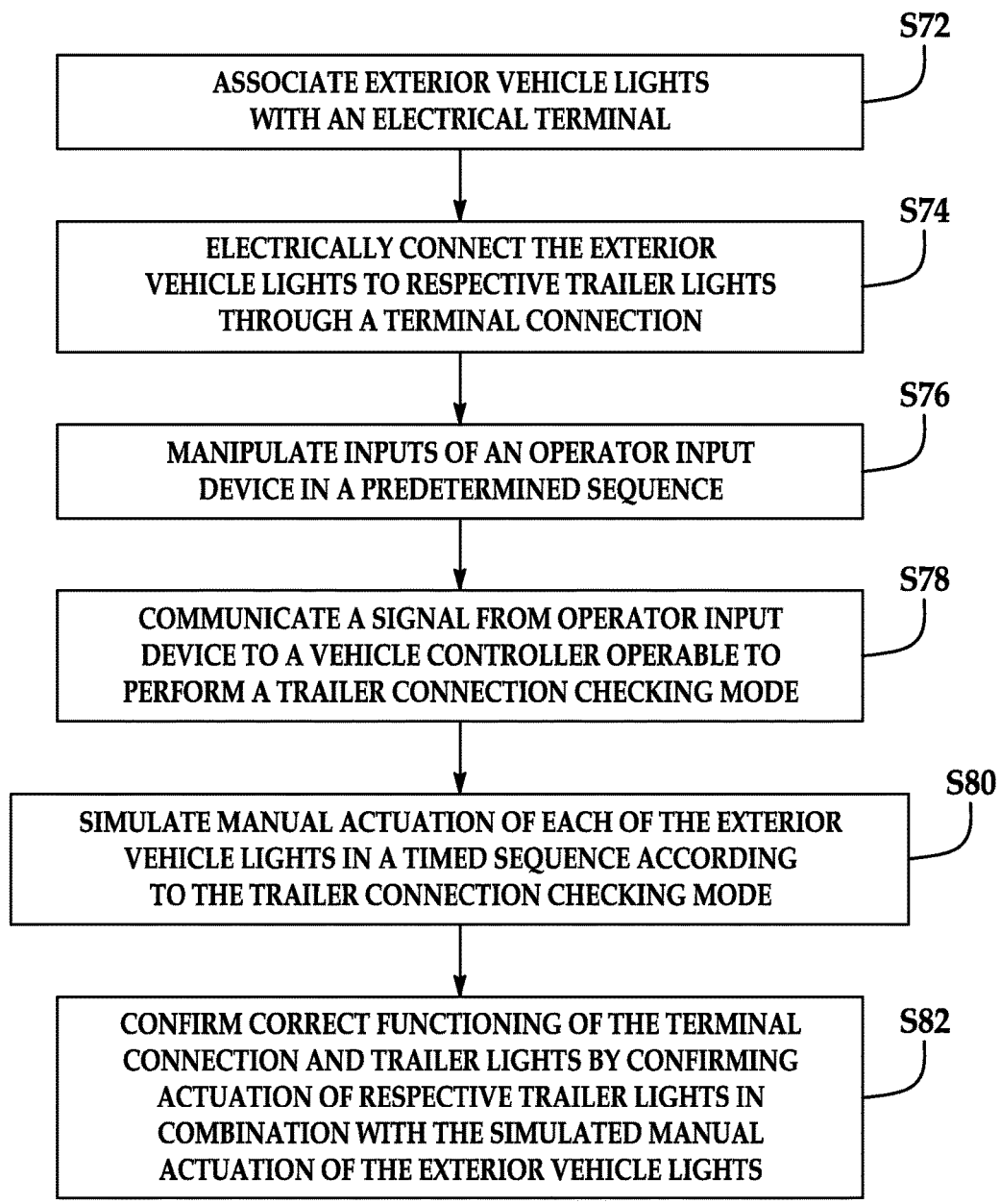
FIG. 4 is a flow diagram illustrating a method for checking an electrical connection between the vehicle and the trailer.

As shown in FIG. 4, in order to facilitate checking of the terminal connection 36, the vehicle controller 28 can simulate the manual actuation of the exterior vehicle lights 18 with the lighting control system 34 in accordance with a trailer connection checking mode. According to the illustrated process, in step S72, some or all of the exterior vehicle lights 18 of the vehicle 10 are associated with respective electrical terminals, for example the terminals 56, 60 described above. In step S74, the exterior vehicle lights 18 are electrically connected to respective corresponding trailer lights 20 though a terminal connection 36, such as the electrical connector 50. Then, in steps S76 and S78, an operator input device 14 can be manipulated to cause a signal to be communicated to a controller, such as the vehicle controller 28 including the lighting control system 34, to perform a trailer connection checking mode.

Referring back to FIG. 2A, an operator input device 14 can be communicatively coupled to the vehicle controller 28 including the lighting control system 34, and the vehicle controller 28 can be responsive to the operator input device 14 to initiate the trailer connection checking mode with the lighting control system 34. Any of a variety of operator input devices 14 can be used for this purpose, such as a button included in the instrument panel 22 or otherwise within the interior of the vehicle 10, or a button included on the exterior of the vehicle 10 located, for example, adjacent the electrical connector 50 first end 52. The operator input device 14 can also be a communication device positionable outside of the vehicle 10. For example, in FIG. 1, the operator input device is illustrated as a key fob 14, which may already be a standard accessory to the vehicle 10. The operator input device 14 may have a plurality of standard inputs 16 for standard communication with the vehicle 10. An additional input 16 could be added to the key fob 14 for communicating a signal to the vehicle controller 28 to perform a trailer connection checking mode with the lighting control system 34, or, a standard key fob 14 could be configured to communicate such a signal upon the manipulation of the inputs 16 in a predetermined sequence. For example, two or more inputs 16 could be manipulated in succession, two or more inputs 16 could be manipulated in unison, or the inputs 16 could be manipulated in any other manner. The vehicle 10 can have more than one operator input device 14. For example, the vehicle 10 can be provided with a key fob 14 configured for communication with the vehicle controller 28 to initiate the trailer connection checking mode with the lighting control system 34, and can also be provided with a button for initiating the trailer connection checking mode.

Referring again to FIG. 4, in step S80, the vehicle controller 28 simulates manual actuation of the exterior vehicle lights 18 with the lighting control system 34 in a timed sequence according to the trailer connection checking mode. The simulated manual actuation of the exterior vehicle lights 18 directly or indirectly causes the actuation of a respective corresponding trailer light 20, in the same way that manual actuation of the exterior vehicle lights 18 directly or indirectly causes the actuation of a respective corresponding trailer light 20. For example, in the illustrated implementation of a terminal connection 36, the vehicle controller 28 including the lighting control system 34 can cause an electrical power to be supplied to the terminals 56, 60 of the electrical connector 50 by actuating the exterior vehicle lights 18.

When the exterior vehicle lights 18 are actuated, the electrical power is simultaneously supplied to the terminals 58, 62 of a coupled second end 54, thereby causing respective corresponding trailer lights 20 to actuate. However, in other implementations of a terminal connection 36, manual actuation of the exterior vehicle lights 18 can be simulated by sending electrical power and/or appropriate control signals to a terminal connection 36 in order to cause actuation of the trailer lights 20. If the terminal connection 36 is configured to provide a non-direct connection between an exterior vehicle light 18 and a respective corresponding trailer light 20, each simulated actuation of an exterior vehicle light 18 can be performed in combination with an actual actuation of the exterior vehicle light 18, so as to provide a visual indication to a person checking the terminal connection 36 of which manual actuation is being simulated.

Finally, in step S82, correct functioning of the terminal connection 36 and trailer lights 20 is performed. Because the vehicle controller 28 including the lighting control system 34 is responsive to the operator input device 14, a person causing the operator input device 14 to communicate a signal to the vehicle controller 28 to initiate the trailer connection checking mode with the lighting control system 34 can also check the terminal connection 36. As shown, this procedure includes confirming actuation of the trailer lights 20 in combination with the simulated manual actuation of the respective corresponding exterior vehicle lights 18.

In the trailer connection checking mode, vehicle controller 28 can simulate manual actuation of each of the exterior vehicle lights 18 with the lighting control system 34, so that actuation of each possible respective corresponding trailer light 20 can be confirmed. Additionally, manual actuation of each of the exterior vehicle lights 18 can be simulated in a timed sequence over a predetermined period of time, for example, a period of time corresponding to an amount of time required to travel around the trailer 12 to confirm proper operation of each of the trailer lights 20.

Figure 5:
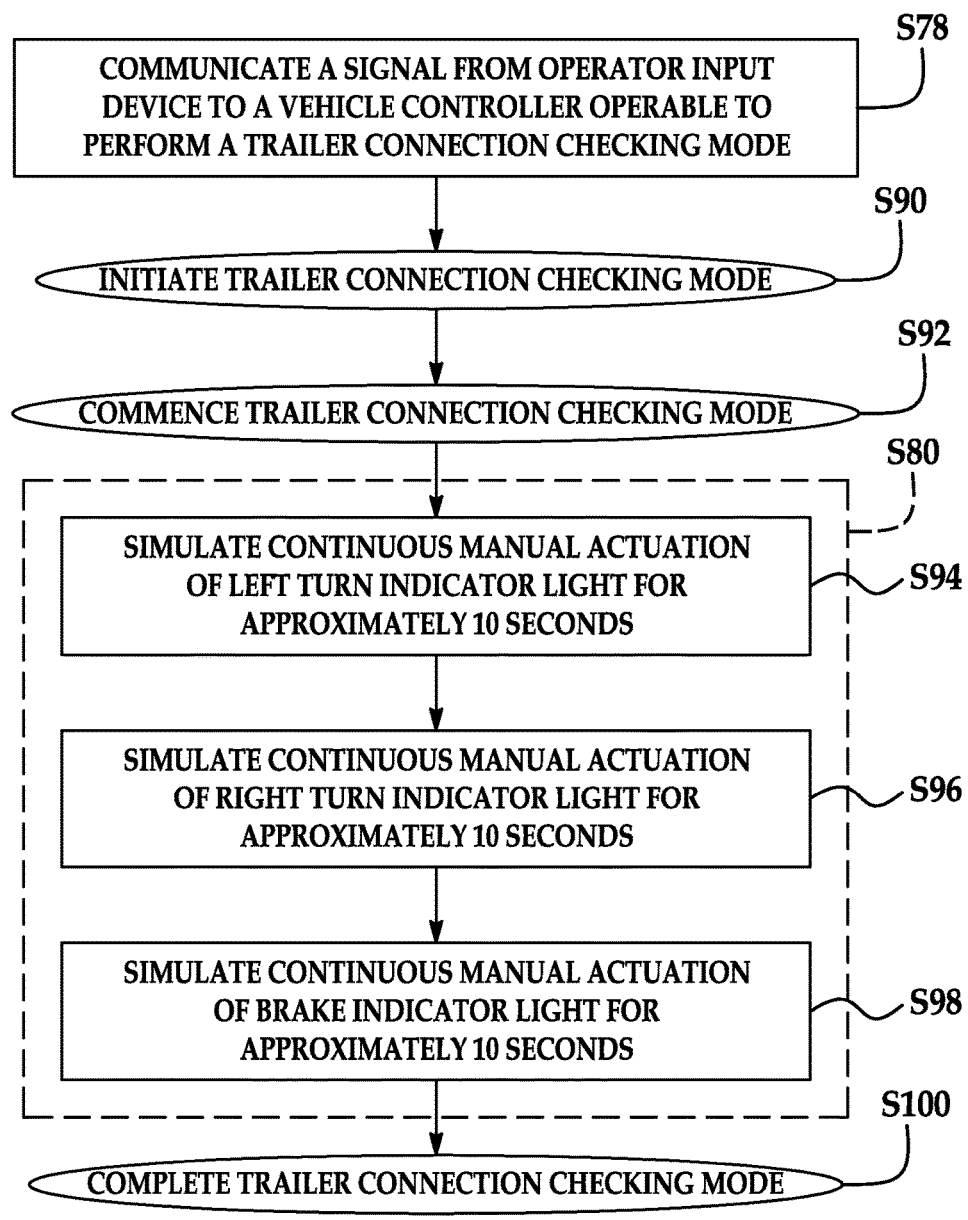
FIG. 5 is a flow diagram illustrating an implementation of a method for initiating and performing a trailer connection checking mode with the vehicle controller.

One exemplary implementation of the trailer connection checking mode is illustrated in FIG. 5. In step S78, an operator input device 14 communicates a signal to the vehicle controller 28 to perform a trailer connection checking mode with the lighting control system 34. The vehicle controller 28 is responsive to the operator input device 14 to initiate the trailer connection checking mode with the lighting control system 34 in step S90, and the vehicle controller 28 commences the trailer connection checking mode with the lighting control system 34 in step S92. In step S80, the vehicle controller 28 simulates manual actuation of the exterior vehicle lights 18 with the lighting control system 34 in a timed sequence according to the trailer connection checking mode. In the implementation of the trailer connection checking mode illustrated in FIG. 5, the exterior vehicle lights 18 include a left turn indicator light, a right turn indicator light and a brake indicator light. Step S80 includes sub-steps S94, S96 and S98, in which the vehicle controller 28 simulates the manual actuation of each of the exterior vehicle lights 18.

The manual actuations of each of the exterior vehicle lights 18 can be simulated in such a manner as to permit ease of confirmation of the proper operation of each of respective corresponding trailer lights 20. For example, a continuous manual actuation of each the exterior vehicle lights 18 can be simulated. The continuous manual actuation of each the exterior vehicle lights 18 can additionally be simulated for a predetermined time interval within the predetermined period of time required to travel around the trailer 12 to confirm proper operation of each of the trailer lights 20. For example, according to the implementation of the trailer connection checking mode illustrated in FIG. 5, the vehicle controller 28 simulates continuous manual actuation of the left turn indicator light for approximately 10 seconds in step S94, simulates continuous manual actuation of the right turn indicator light for approximately 10 seconds in step S96 and simulates continuous manual actuation of the brake indicator light for approximately 10 seconds in step S98. Although the continuous manual actuation of each of the exterior vehicle lights 18 is described as being simulated for a predetermined time interval of approximately 10 seconds, the predetermined time interval could be different from approximately 10 seconds, and can vary between different exterior vehicle lights 18, depending, for instance on the configuration of the vehicle 10 and/or the configuration of the trailer 12. In addition, both the predetermined time interval and the predetermined period of time could be fixed, or, for example, could be adjustable by an operator of the vehicle 10. In step S100, the trailer connection checking mode is completed by the vehicle controller 28.

Figure 6:
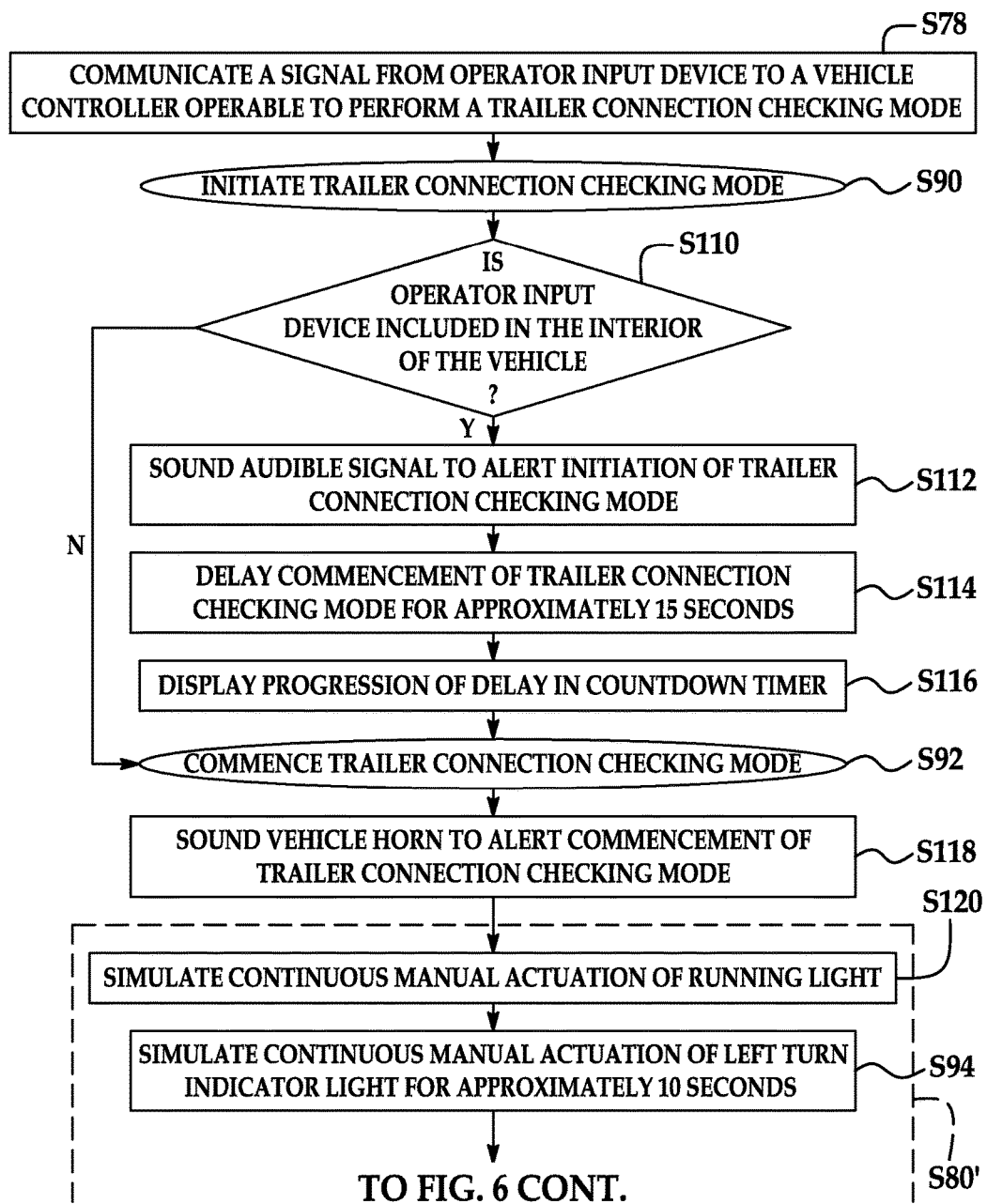
FIG. 6 is a flow diagram illustrating an alternative implementation of a method for initiating and performing a trailer connection checking mode with the vehicle controller.
Figure 6:
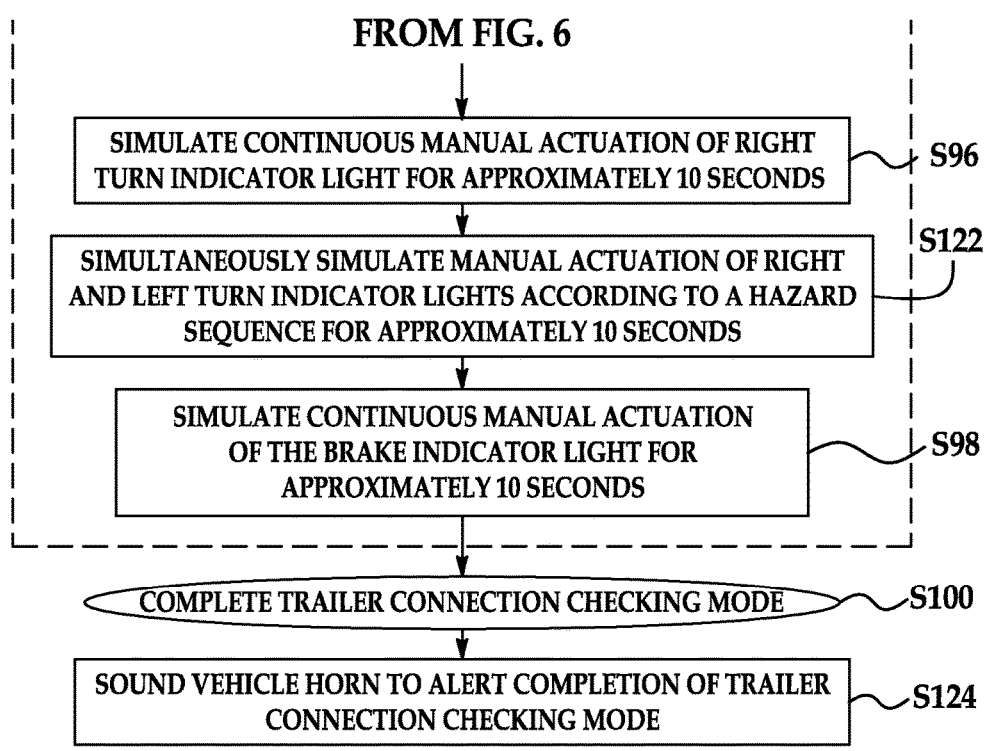

An alternative implementation of the trailer connection checking mode is illustrated in FIG. 6. In step S78, an operator input device 14 communicates a signal to the vehicle controller 28 to perform a trailer connection checking mode with the lighting control system 34. The vehicle controller 28 is responsive to the operator input device 14 to initiate the trailer connection checking mode with the lighting control system 34 in step S90. The vehicle controller 28 is further responsive to the operator input device 14 to control other aspects of the vehicle 10, including operation of the components instrument panel 22 and the vehicle horn 24, for example, in combination with the initiation and performance of the trailer connection checking mode with the lighting control system 34.

In step S110, the vehicle controller 28 determines whether the operator input device 14 is included within the interior of the vehicle 10. If the vehicle controller 28 determines that the operator input device 14 is not included within the interior of the vehicle 10, the vehicle controller 28 proceeds to step S92. However, when the trailer connection checking mode is initiated by an operator input device 14 included within the interior of the vehicle 10, the controller 28 sounds an audible signal to alert the initiation of the trailer connection checking mode in step S112. The audible signal can be generated with various components known to those skilled in the art, and such components can be housed within the instrument panel 22 or otherwise within the interior of the vehicle 10. Although the signal in the illustrated implementation of the trailer connection checking mode is an audible signal, the signal could alternatively be a visual signal or an audiovisual signal, for example.

In step S114, the vehicle controller 28 delays commencement of the trailer connection checking mode. The delay is configured to permit an operator of the vehicle 10 who manipulates the operator input device 14 from within the interior of the vehicle 10 to exit the vehicle 10 and move into a suitable position outside of the vehicle 10 to confirm proper operation of each of the trailer lights 20 during performance of the trailer connection checking mode by the lighting control system 34. The illustrated delay is approximately 15 seconds, although the delay could vary depending, for instance, on the configuration of the vehicle 10 and/or the configuration of the trailer 12. In addition, the delay could be fixed, or, for example, could be adjustable by an operator of the vehicle 10. As shown in step S116, the progression of delay can be displayed to an operator of the vehicle 10. The delay could be displayed in a countdown timer or in other displays known to those skilled in the art. A display for displaying the delay could be housed within the instrument panel 22 or otherwise within the interior of the vehicle 10, or could alternatively or additionally be included in the exterior of the vehicle 10.

In step S92, the vehicle controller 28 commences the trailer connection checking mode with the lighting control system 34. In step S118, the controller 28 sounds an audible signal to alert the commencement of the trailer connection checking mode. The audible signal is illustrated as being generated by the vehicle horn 24, but for example could be generated by other components known to those skilled in the art. In addition, although the signal is illustrated as an audible signal, the signal could alternatively be a visual signal or an audiovisual signal perceivable from outside the vehicle 10.

In step S80', the vehicle controller 28 simulates manual actuation of the exterior vehicle lights 18 with the lighting control system 34 in a timed sequence according to the trailer connection checking mode. In the implementation the trailer connection checking mode illustrated in FIG. 6, the exterior vehicle lights 18 include a left turn indicator light, a right turn indicator light, a brake indicator light and a running light.

Similar to step S80 in the implementation of the trailer connection checking mode illustrated in FIG. 5, in step S80' the manual actuations of each of the exterior vehicle lights 18 can be simulated in such a manner as to permit ease of confirmation of the proper operation of each of respective corresponding trailer lights 20. For example, a continuous manual actuation of each the exterior vehicle lights 18 can be simulated. The continuous manual actuation of each the exterior vehicle lights 18 can additionally be simulated for a predetermined time interval within the predetermined period of time required to travel around the trailer 12 to confirm proper operation of each of the trailer lights 20. For example, according to the implementation of the trailer connection checking mode illustrated in FIG. 5, the vehicle controller 28 simulates continuous manual actuation of the running light in step S120, and the continuous manual actuation of the running light in step S120 is sustained until completion of the trailer connection checking mode. The vehicle controller 28 simulates continuous manual actuation of the left turn indicator light for approximately 10 seconds in step S94, and simulates continuous manual actuation of the right turn indicator light for approximately 10 seconds in step S96. In step S122, the vehicle controller 28 can simultaneously simulate continuous manual actuation of both the left turn indicator light and the right turn indicator light according to a hazard sequence for approximately 10 seconds. In step S98, the vehicle controller 28 simulates continuous manual actuation of the brake indicator light for approximately 10 seconds. Although the continuous manual actuation of each of the exterior vehicle lights 18 is described as being simulated for a predetermined time interval of approximately 10 seconds, the predetermined time interval could be different from approximately 10 seconds, and can vary between different exterior vehicle lights 18, depending, for instance on the configuration of the vehicle 10 and/or the configuration of the trailer 12. In addition, both the predetermined time interval and the predetermined period of time could be fixed, or, for example, could be adjustable by an operator of the vehicle 10.

In step S100, the trailer connection checking mode is completed by the vehicle controller 28. In step S124, the vehicle controller 28 again sounds an audible signal to alert the completion of the trailer connection checking mode. The audible signal can be the same or similar to the audible signal sounded in step S118. The audible signal is illustrated as being generated by the vehicle horn 24, but for example could be generated by other components known to those skilled in the art. In addition, although the signal is illustrated as an audible signal, the signal could alternatively be a visual signal or an audiovisual signal perceivable from outside the vehicle 10.

The simulated manual actuations of exterior vehicle lights 18 other than those described in the implementations of the trailer connection checking mode illustrated in FIGS. 5 and 6 could also be performed, depending upon the configuration of the vehicle 10 and/or the configuration of the trailer 12. The simulated manual actuations of the exterior vehicle lights 18 are generally shown in the non-limiting examples of FIGS. 5 and 6 as being performed sequentially, although the simulated manual actuations of the exterior vehicle lights 18 could also be performed simultaneously, in a partially overlapping manner and/or according to other patterns to assist in a visual confirmation of the actuation of respective corresponding trailer lights 20. Further, the respective ordering of the simulated manual actuations between each of the exterior vehicle lights 18 could be altered without departing from the illustrated implementations of the trailer connection checking mode.

The vehicle 10 may additionally include a trailer brake controller 116. The trailer brake controller 116 (e.g., trailer brake control unit, or TBCU) is contained within the vehicle 10, and is configured to control operation of trailer brakes 118 of the trailer 12. The trailer brake controller 116 is in communication with the trailer brakes 118 via a first communications channel 120 (e.g., TBCU-trailer brakes path, circuit, etc.) formed by a terminal connection 38 (e.g., with terminals 64, 66 of the connector 50). The trailer brake controller 116 is configured to detect a braking condition of the vehicle, and then send trailer brake control signals 122 through the first communications channel 120 for controlling operation the trailer brakes 118. The trailer brakes 118 are configured to receive and process the trailer brake control signals in an appropriate manner (e.g., with appropriate circuitry and controllers thereof), and provide braking for the trailer 12. As will be discussed in further detail below, the trailer brake controller 116 may also be integrated with the vehicle controller 28 in various manners for use with the trailer connection checking mode.

Figure 7:
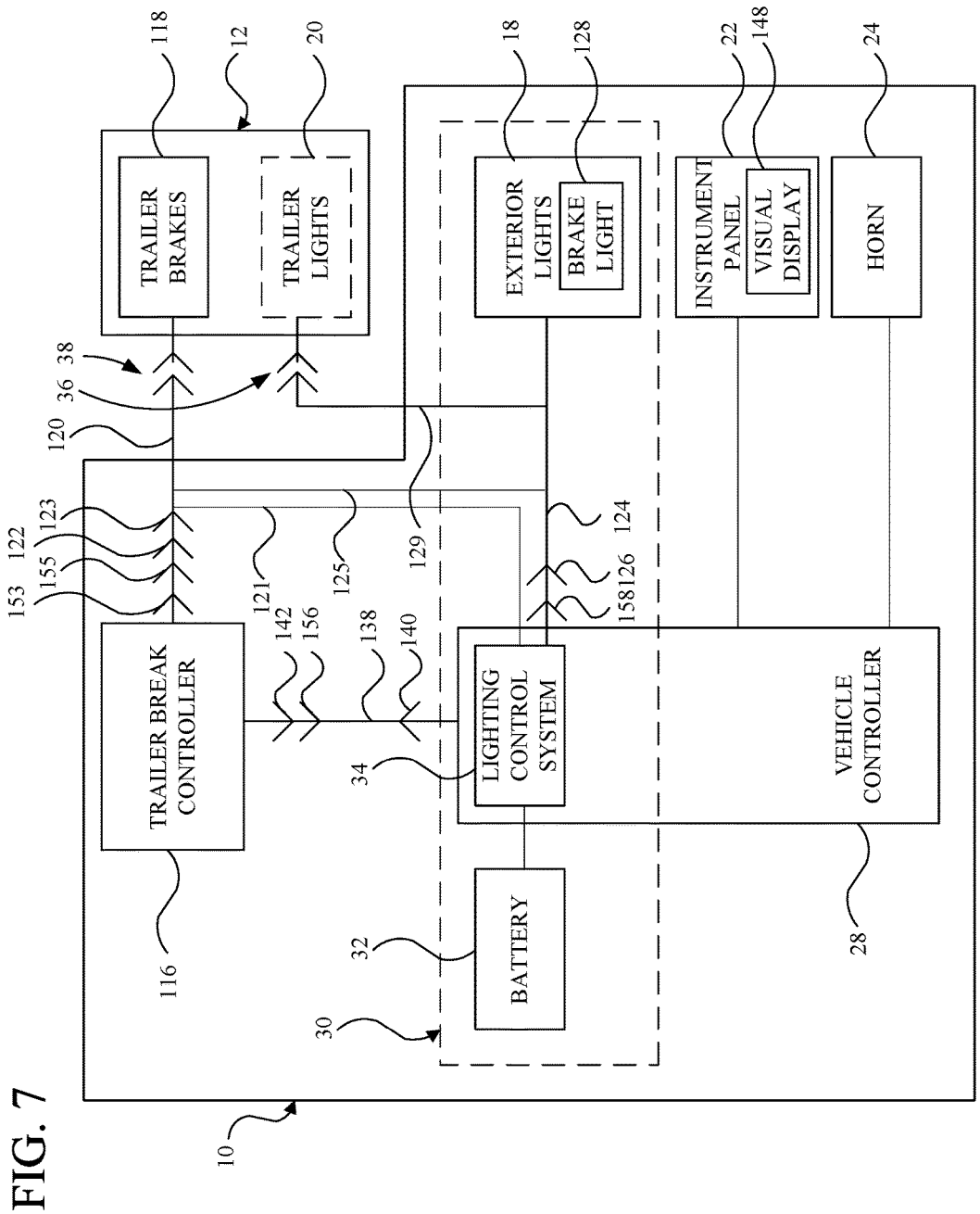
FIG. 7 is a schematic of a vehicle and a trailer, including a control system of the vehicle, according to an exemplary embodiment.

The trailer brake controller 116 may be configured to detect or determine in various manners occurrence and/or parameters of the braking condition of the vehicle 10. As shown in FIG. 7, the trailer brake controller 116 monitors another communications channel 124 (e.g., second or vehicle lights path, circuit, etc.) by which the vehicle controller 28, or the lighting control system 34 thereof, sends a brake light control signal 126 (e.g., electrical power) to a brake light 128 of the exterior lights 18 of the vehicle 10. For example, the trailer brake controller 116 may monitor the communications channel 124 with a monitoring channel 125 (e.g., first or vehicle monitoring path, circuit, etc.) extending therebetween. The brake light signal 126 is additionally sent to the trailer lights 20 via another communications channel 129 (e.g., trailer lights branch, path, circuit, etc.) through the terminal connection 36.

Upon detection of the brake light control signal 126, the trailer brake controller 116 makes a binary determination (e.g., on/off) of occurrence of the braking event. According to other exemplary embodiments, the trailer brake controller 116 may include an accelerometer, so as to further assess and/or characterize the braking event.

Based on the determination of the occurrence of the braking event, as well as the characterization of the braking event for trailer brake controllers 116 that include the accelerometer, the trailer brake controller 116 determines and sends the trailer brake control signal 122 to the trailer brakes 118.

Figure 8:
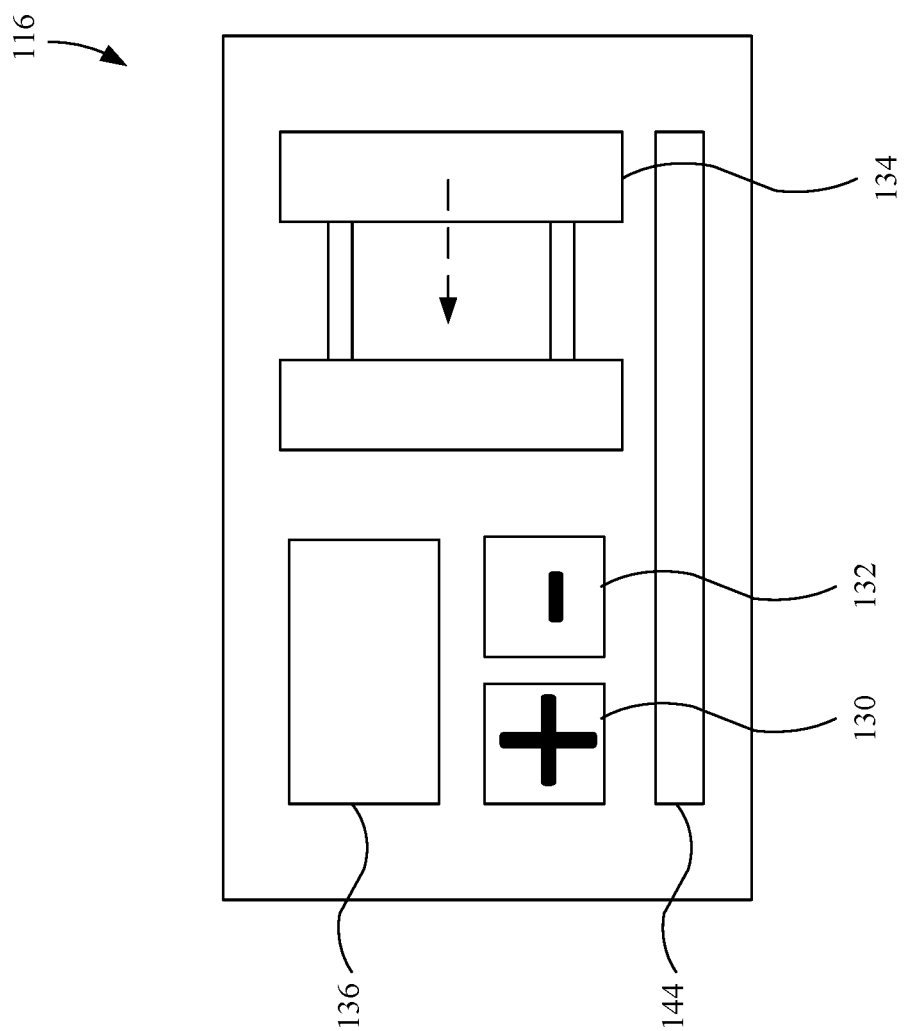
FIG. 8 is a front view of a trailer brake controller of the embodiment shown in FIG. 7.

The trailer brake controller 116 may also include user inputs for adjusting and/or sending the trailer brake control signal 122. For example, as shown in FIG. 8, the trailer brake controller 116 includes gain inputs 130, 132 (e.g., buttons or switches) for selectively decreasing and increasing, respectively, a gain (e.g., boost) value. By increasing/decreasing the gain value, the trailer brake controller 116 adjusts the trailer brake control signal 122 for more/less braking from the trailer brakes 118. The trailer brake controller 116 also includes a manual input 134 (e.g., button or switch) for manually operating the trailer brakes 118. When a user operates the input 134, the trailer brake controller 116 sends the trailer brake control signal 122 to the trailer brakes 118. The trailer brake controller 116 may also include a display 136 for displaying various information (e.g., gain value, value of the trailer brake control signal 122, etc.).

According to some embodiments, instead of or in addition to the trailer brake controller 116 monitoring the communications channel 124, the trailer brake controller 116 may be in communication with the vehicle controller 28 via another communications channel 138 (e.g., third or TBCU-vehicle path, circuit, etc.). The communications channel 138 allows the vehicle controller 28 to send a vehicle controller signal 140 to the trailer brake controller 116, which may include control signals, information related to the braking event (e.g., occurrence, severity, road conditions, etc.) or the vehicle 10 (e.g., brake pedal pressure, vehicle speed, wheel speed, vehicle acceleration in and/or about different axes, etc.). These signals and information may be processed by the trailer brake controller 28 in various manners to assess the braking event, and to determine and send appropriate trailer brake control signals 122.

According to an exemplary embodiment, the trailer brake controller 116 and the vehicle are configured for the trailer brake controller 116 to function as the operator input device 14 for initiating the trailer connection checking mode (e.g., as described above, or other manner for operating the trailer lights 20 in a predetermined manner). In one example, the vehicle controller 28 is configured to monitor the first communications channel 120 with another monitoring channel 121 (e.g., second or trailer monitoring path, circuit, etc.). Upon detection of an initiation signal 123 sent by the trailer brake controller 116, the vehicle controller 28 initiates the trailer connection checking mode, or as will be discussed in further detail below, prompts a user to initiate the trailer connection checking mode.

The initiation signal 123 is initiated by the user pressing a predetermined combination of the inputs 130, 132, 134. For example, the predetermined input combination may include a hold and release pattern of the input 128 (e.g., hold five seconds, release, hold five seconds, release), which sends the trailer brake control signal 122 in the same pattern. In this manner, the initiation signal 123 is sent as the trailer brake control signal 122. Since the initiation signal 123 is sent via the first communication channel 120, which connects to the trailer brakes 118, the initiation signal 123 may also consequently operate the trailer brakes 118. Upon detection of the initiation signal 123, the vehicle controller 28 initiates (i.e., is programmed to) the trailer connection mode or prompt the user to do so. Preferably, the initiation signal 123 is of a different form or sequence from those expected during normal operation of the trailer brake controller 116, so as to prevent unintended operation of the trailer brakes 118.

In another example, the trailer brake controller 116 sends a unique initiation signal 123 that does not directly correspond to the combination of inputs. The predetermined input combination may include a hold and release sequence of the inputs 130, 132, which in normal operation adjust the gain value but do not cause the trailer brake control signal 122 to be sent. The initiation signal 123, thereby, does not correspond to normal sending of the trailer brake control signal 122. For example, the predetermined input combination may include holding inputs 130, 132 simultaneously for five seconds, followed by holding the input 134 a short duration, while the initiation signal 123 may be a pulsing signal. Upon detection of the initiation signal 123 via the trailer brake control signal 122, the vehicle controller 28 initiates the trailer connection checking mode or prompts the user to do so.

In yet another example, instead of or in addition to sending the initiation signal 123 via the communications channel 120, the trailer brake controller 116 sends an initiation signal 142 via the communications channel 138. Again, the user input includes pressing a predetermined combination of the inputs 130, 132, 134. Upon detection of the initiation signal 142, the vehicle controller 28 initiates the trailer connection checking mode or prompts the user to do so.

The vehicle controller 28 may additionally be configured to initiate the trailer connection checking mode only in conditions conducive for visually confirming operation of the trailer lights 20. That is, sending of the initiation signal 123 or 142 may be disabled in certain unsuitable conditions (e.g., while the vehicle is moving), which may be determined by other inputs to the vehicle controller 28 (e.g., vehicle speed, transmission drive position, etc.). This may be particularly advantageous for embodiments in which the initiation signal 123 is provided via the trailer brake control signal 122, since the trailer brake control signal 122 might otherwise cause operation of the trailer brakes 118.

In other embodiments, as will be discussed below, other devices are utilized for initiating the trailer connection checking mode.

The vehicle 10 may also include or be configured to provide information and controls related to operation of the trailer connection checking mode. This information and controls may include an indication that the trailer connection checking mode is an available feature, inputs for selecting and operating the trailer connection checking mode, and/or instructions for initiating and/or operating the trailer connection checking mode. In one example, the vehicle 10 includes a fixed indication 144, which includes instructions for initiating the trailer connection checking mode. For example, as shown in FIG. 8, the trailer brake controller includes the fixed indication 144, which is provided as printed or fixed characters on a visible surface of the trailer brake controller 116. The fixed indication 144 may, for example, be a printed phrase stating "Hold+/−5 Seconds for Trailer Light Check," or other appropriate phrase for indicating availability of and instructions for operating the trailer connection checking mode.

Instead of or in addition to the fixed indication 144, the vehicle 10 may provide a dynamic prompt 146, which may provide an indication regarding availability of the trailer connection checking mode and control options for initiating the trailer connection checking mode. For example, the vehicle controller 28 may be configured to provide the dynamic prompt 146 visually and/or audibly via a device of or associated with the vehicle 10 (e.g., via the instrument panel 22, a speaker of the vehicle 10, and/or the key fob 14).

Figure 9:
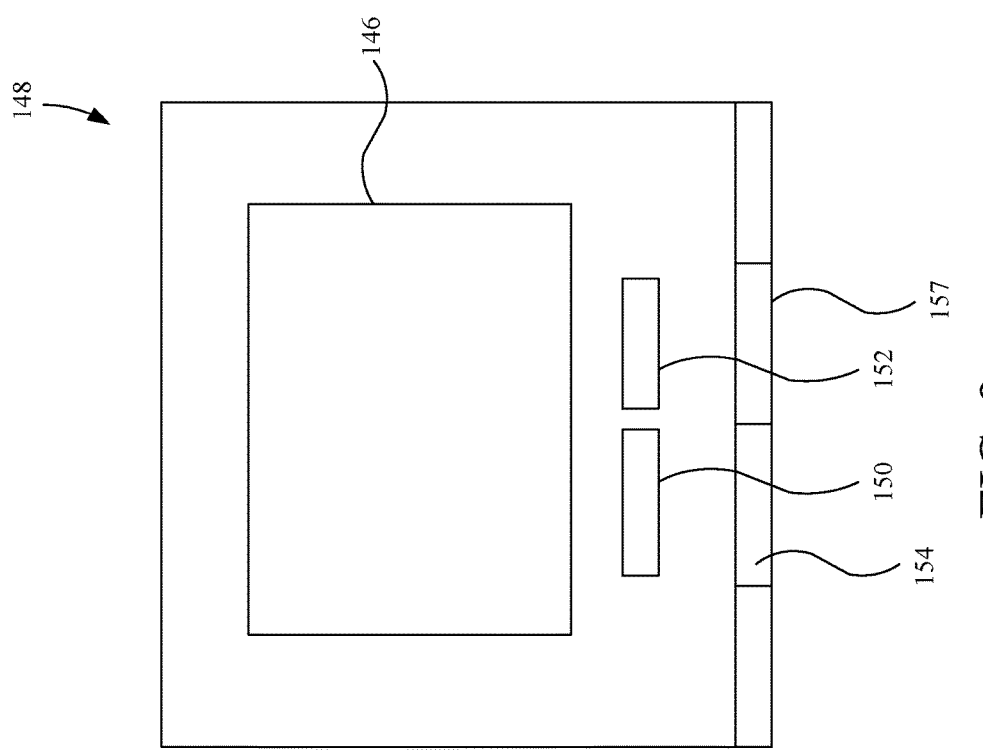
FIG. 9 is a front view of a display of the embodiment shown in FIG. 7.
Figure 10:
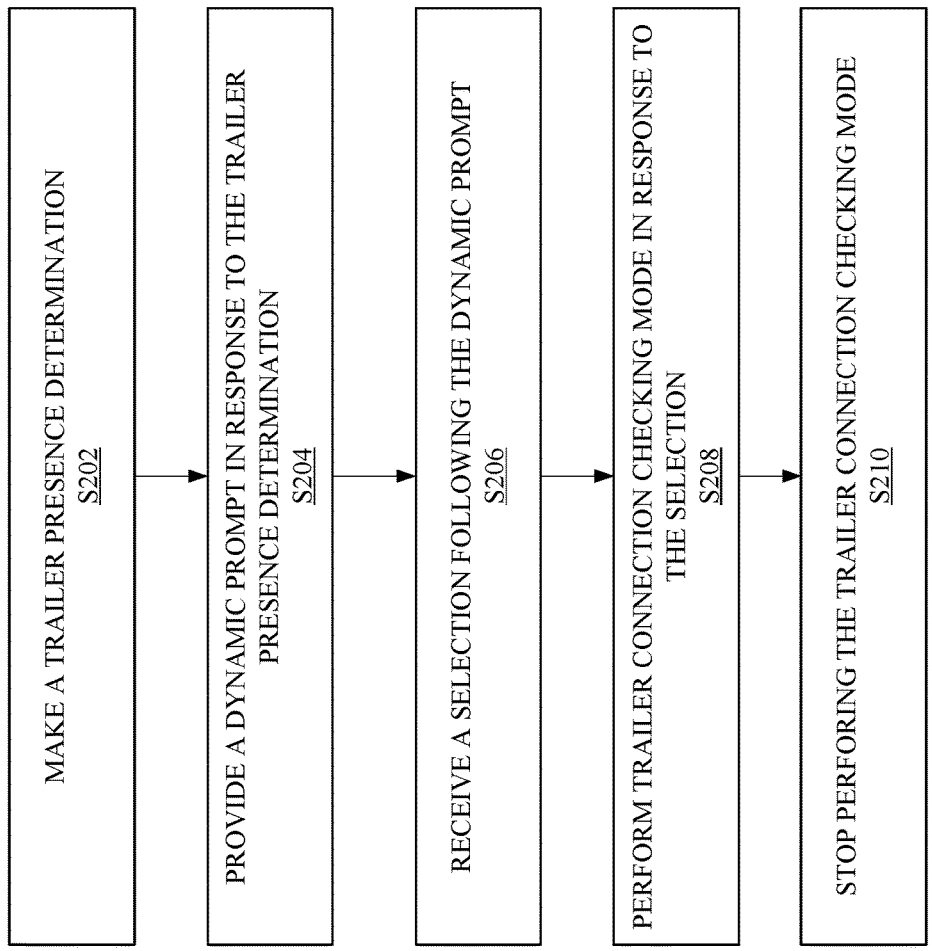
FIG. 10 is a flow chart of a method associated with the embodiment shown in FIG. 7.

When provided visually, the dynamic prompt 146 may be provided by the instrument panel 22, such as by a visual display 148 (e.g., display screen, such as LCD) of the instrument panel 22 (see FIG. 9). For example, the visual display 148 may be included in an instrument cluster of the vehicle 10 (e.g., along with virtual or physical gauges, such as a speedometer, in front of a driver), on a center stack of the vehicle 10, or as part of an infotainment screen (e.g., a screen that might also be used for navigation, music controls, backup camera display).

The dynamic prompt 146 includes text and/or iconography indicative of the trailer connection checking mode, and may also include instructions for initiating the trailer connection checking mode. The text of the dynamic prompt 146 may, for example, include a short phrase on how to initiate the trailer connection checking mode, such as "Initiate trailer light check?," while communication or instructing user input options. To communicate or instruct the user input options with the dynamic prompt 146, the visual display 148 may be touch sensitive, and display virtual buttons 150, 152 stating "Yes" and "No" options that are selectable by the user. Instead or additionally, to communicate or instruct the user input options, physical buttons 154, 157 of the instrument panel 22 may be provided for selecting "Yes" or "No" (e.g., physical buttons positioned proximate displayed "Yes" and "No" options, or another selection input device).

In one embodiment, the trailer connection checking mode may begin after a predetermined amount of time after a user input option is selected (e.g., sufficient time for a user to exit the vehicle 10, as described previously), and operate for a predetermined amount of time (e.g., sufficient for the user to check each of the trailer lights 20). Upon completion of light sequence of the trailer connection checking mode, the dynamic prompt 146 may be removed (e.g., disappear) from the visual display 148, or may prompt a user to repeat the trailer connection checking mode. For example, the dynamic prompt 146 may display "Repeat trailer light check?" and provide input options of "Yes" and "No," or "Repeat" and "Done." Alternatively, the trailer connection checking mode may run continuously until ended by the user. For example, the dynamic prompt 146 may provide an input option of "End" or "Pause." Without any selection by a user, the dynamic prompt 146 may disappear or be removed after a predetermined amount of time (e.g., 10 seconds after startup of the vehicle).

Instead of or in addition to providing the user with the input options described above, the dynamic prompt 146 may instruct a user to initiate the trailer connection checking mode with the trailer brake controller 116 in one of the manners described above, or via another input device. The iconography of the dynamic prompt 146 may also indicate how the trailer connection checking mode functions, for example, by displaying a virtual trailer and sequentially flashing lights thereof.

When provided audibly, the dynamic prompt 146 may be provided by a speaker 150 of the vehicle 34 and/or the key fob 14. The dynamic prompt 146 may, for example, be a recorded audio message that recites an instructional phrase, such as "To initiate the trailer light check . . . ," or other appropriate phrase, and an appropriate phrase communicating instructions to initiate the trailer connection checking mode (e.g., as provided above via the trailer brake controller 116, the instrument panel 22, or the key fob 14). Alternatively, the dynamic prompt 146 may be a generic sound, such as a chime, that indicates to the user the dynamic prompt 146 being displayed visually on the visual display 148. The vehicle 10 may also be configured to receive a user input audibly for initiating the trailer connection checking mode by including a microphone (not shown) and appropriate voice recognition software for interpreting an audible statement of the user as an input.

The vehicle controller 28 may also be configured to provide the dynamic prompt 146 in response to various conditions, such as starting the vehicle 10 or upon detection of the trailer 12 being present near the vehicle 10. The trailer 12 may be considered present when connected to the vehicle 10 in some manner (e.g., the connector trailer brake controller 116, vehicle controller 28, the connector 50, etc.) or is proximate the vehicle 12 (e.g., is positioned therebehind).

In one example, the trailer brake controller 116 is configured to detect presence of the trailer 12. The trailer brake controller 116 sends a trailer check signal 153 (e.g., a pulse width modulated signal) and, thereby, may detect a resistive load associated with connection of the trailer brakes 118 to the trailer brake controller 116. As described above, this connection may be formed by the terminal connection 38 with the connector 50). Upon detection of the resistive load, which indicates presence of the trailer 12, the trailer brake controller 116 then sends a trailer presence signal 155 via the first communications channel 120 (i.e., that which communicates with the trailer brakes 118), which is monitored by the vehicle controller 28 via the monitoring channel 125. Instead or additionally, the trailer brake controller 116 may send a trailer presence signal 156 via the third communications channel 138 (i.e., that which communicates directly to the vehicle controller 28). Upon detection of the trailer presence signals 155 and/or 156, the vehicle controller 28 then provides the dynamic prompt 146 to prompt the user to initiate or decline the trailer connection checking mode, as described above.

In another example, the vehicle controller 28 and/or the lighting control system 34 thereof, is configured to send a trailer check signal 158 to the trailer lights 20 and detect connection thereto (e.g., via the communications channel 126 and/or 129). The lighting control system 34 can send electrical power according to an initiation sequence to the trailer lights 20 and detect a change in voltage or current, as compared to if the trailer lights 20 were not connected thereto.

In yet another example, the vehicle controller 28 may instead or additionally determine presence of the trailer 12 using visual recognition. A backup camera 160 may capture a rear facing image from the vehicle 10, which is analyzed using visual recognition software to assess whether the trailer 12 is present.

Alternative manners for detecting the presence of the trailer 12 may also include detecting changes in position of a rear suspension of the vehicle 10 and/or acceleration, which reflect placement of a heavy load on a rear of the vehicle 10. Furthermore, a control system may be considered to include both the vehicle controller 28 and the trailer brake controller 116. Each of the manners for trailer detection described above may be used alone or in conjunction with each other (e.g., for redundancy, increased accuracy, etc.).

While the vehicle controller 28 and the trailer brake controller 116 are discussed herein as being discrete control units or systems, it should be understood that one or more (e.g., all) of the described operations and functions of the vehicle controller 28 and the trailer brake controller 116 may be incorporated into a common control unit, thereby obviating the need to send various signals therebetween. For example, the trailer brake controller 116 may be configured to control the trailer lights 20 and/or execute the trailer connection check mode, or alternatively, the vehicle controller 28 may send the trailer brake control signal 122 to the trailer brakes 118. Additionally, the trailer brake controller 116 may be omitted or not utilized, while the vehicle controller 28 may still determine the presence of the trailer 12, which may be advantageous in scenarios in which the trailer 12 does not include trailer brakes 118.

In accordance with the embodiments describe above, a method is provided for initiating and performing the trailer connection checking mode.

In step S202, the control system makes a trailer presence determination of whether a trailer is present. The trailer presence determination may be made by the trailer brake controller 116, such as by sending the trailer check signal 153 to the trailer brakes 118 and determining a resistive load, as described above. As part of step S202, according to the trailer presence determination, the trailer brake controller 116 then sends a trailer presence signal 155 via the first communications channel 120, which is monitored by the vehicle controller 28 via the monitoring channel 121, or an alternative trailer presence signal 156 via the third communications channel 138 directly to the vehicle controller 28.

As an alternative to the trailer brake controller 116 making the trailer presence determination in step S202, the vehicle controller 28 can make the trailer presence determination. For example, the trailer brake controller 116 may be in communication with the camera 160, and make the determination according to images captured by the camera 160 (e.g., with visual recognition software). The trailer brake controller 116 may instead, or additionally, make the trailer presence determination by sending a trailer check signal 158 to the trailer lights 20 and assessing a change in voltage or current.

In step S204, the vehicle controller 28 provides the dynamic prompt 146 in response to the trailer presence determination. As described above, the dynamic prompt 146 may be provided visually via the visual display 148 and/or audibly via the speaker 150. The dynamic prompt 146 also provides a user input that is selectable by the user to initiate the trailer connection checking mode. The user input may, for example, be virtual buttons of a touch sensitive screen, or physical buttons, for selecting or declining the trailer connection checking mode. The user input may instead, or additionally, be an audible input, such as a phrase received by a microphone and processed by the vehicle controller 28.

In step S206, the vehicle controller 28 receives the selection of the user.

In step S208, in response to the selection, the vehicle controller 28 performs the trailer connection checking mode by operating the trailer lights in a predetermined sequence.

In step S210, the vehicle controller 28 stops performance of the trailer connection checking mode. As described above, the trailer connection checking mode may be stopped by after a predetermined amount of time, or upon receipt of another user selection.

While the present disclosure has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle comprising:
   a control system connectable to a trailer and having a trailer connection checking mode in which the control system actuates trailer lights of the trailer in a predetermined sequence;
   wherein the control system makes a trailer presence determination of whether the trailer is present near the vehicle, and the control system performs the trailer connection checking mode according to the trailer presence determination; and
   wherein the control system provides a dynamic prompt in response to the trailer presence determination, and the dynamic prompt communicates a user input option selectable by a user to initiate the trailer connection checking mode.

2. The vehicle according to claim 1, wherein the control system performs the trailer connection checking mode according to the trailer presence determination upon selection of the user input option.

3. The vehicle according to claim 1, wherein the dynamic prompt is at least one of visual or audible.

4. The vehicle according to claim 3, wherein the dynamic prompt is visual and is provided by a visual display of the vehicle.

5. The vehicle according to claim 1, wherein the control system comprises a vehicle controller, a trailer brake controller, and one or more connectors for connecting trailer lights of the trailer to the vehicle controller and for connecting the trailer brakes to the brake controller;
   wherein the vehicle controller controls actuation of the trailer lights, and performs the trailer connection checking mode; and
   wherein the trailer brake controller controls operation of the trailer brakes.

6. The vehicle according to claim 5, wherein the trailer brake controller makes the trailer presence determination, and sends a trailer presence signal according to the trailer presence determination; and wherein the vehicle controller receives the trailer presence signal, and provides a dynamic prompt in response to the trailer presence signal, the dynamic prompt communicating a user input option selectable by a user to initiate the trailer connection checking mode.

7. The vehicle according to claim 5, wherein the vehicle controller makes the trailer presence determination, and provides a dynamic prompt in response to the trailer presence determination, the dynamic prompt communicating a user input option selectable by a user to initiate the trailer connection checking mode.

8. The vehicle according to claim 7, further comprising a camera in communication with the vehicle controller, wherein the vehicle controller makes the trailer presence determination according to one or more images captured by the camera.

9. The vehicle according to claim 1, wherein the user input option is at least one of a virtual button of a touch sensitive screen or an audible input received by a microphone.

10. A vehicle comprising:
   a vehicle controller connectable to trailer lights of a trailer, the vehicle controller having a trailer connection checking mode in which the vehicle controller operates the trailer lights in a predetermined sequence;
   a trailer brake controller connectable to trailer brakes of the trailer, the trailer brake controller operable to control the trailer brakes; and
   a visual display in communication with the vehicle controller;
   wherein one of the vehicle controller or the trailer brake controller makes a trailer presence determination of whether a trailer is present, and in response to the trailer presence determination, the vehicle controller causes the visual display to display a dynamic prompt communicating a user input option selectable by a user for initiating the trailer connection checking mode; and
   wherein the user input option is at least one of a virtual button of a touch sensitive screen or an audible input received by a microphone.

11. The vehicle according to claim 10, wherein the trailer brake controller makes the trailer presence determination, and sends a trailer presence signal in response to the trailer presence determination; and
   wherein in response to receiving the trailer presence signal, the vehicle controller causes the visual display to display the dynamic prompt.

12. The vehicle according to claim 10, wherein the vehicle controller makes the trailer presence determination, and causes the visual display to display the dynamic prompt in response to the trailer presence determination.

13. The vehicle according to claim 12, wherein the vehicle controller makes the trailer presence determination by at least one of visual recognition or sending trailer check signals to the trailer lights.

14. A method for checking trailer light operation comprises:
   making, with one of a vehicle controller or a trailer brake controller, a trailer presence determination of whether a trailer is present;
   providing, with one of the vehicle controller or the trailer brake controller, a dynamic prompt to a user for initiating a trailer connection checking mode in which trailer lights of the trailer are operated in a predetermined sequence; and
   receiving, with one of a touch sensitive screen or a microphone, a user input for initiating the trailer connection checking mode.

15. The method of claim 14, further comprising receiving a selection by the user to initiate the trailer connection checking mode, and performing the trailer connection checking mode in response to the selection.

16. The method of claim 15, wherein the step of providing the dynamic prompt includes communicating a user input option that is selectable by the user to initiate the trailer connection checking mode, and the step of receiving the selection includes receiving the selection via the user input.

17. The method of claim 16, wherein the step of providing the dynamic prompt includes providing the dynamic prompt visually on a visual display.

18. The method of claim 14, wherein the step of making the trailer presence determination includes one of analyzing an image, sending and processing a trailer check signal to the trailer lights, or sending and processing another trailer check signal to trailer brakes of the trailer.

19. The method of claim 18, wherein the step of making the trailer presence determination is performed by the trailer brake controller that sends a trailer presence signal to the vehicle controller in accordance with the trailer presence determination, and the vehicle controller performs the step of providing the dynamic prompt in response to the trailer presence signal.

20. The method of claim 18, wherein the step of making the trailer presence determination is performed by the vehicle controller that, in response to the trailer presence determination, performs the step of providing the dynamic prompt.

* * * * *